(No Model.)

J. H. WESTCOTT.
LATHE CHUCK.

No. 343,411. Patented June 8, 1886.

WITNESSES
A. F. Walz
E. C. Cannon

INVENTOR
John H. Westcott

UNITED STATES PATENT OFFICE.

JOHN H. WESTCOTT, OF ONEIDA, NEW YORK.

LATHE-CHUCK.

SPECIFICATION forming part of Letters Patent No. 343,411, dated June 8, 1886.

Application filed April 10, 1886. Serial No. 198,413. (No model.)

*To all whom it may concern:*

Be it known that I, JOHN H. WESTCOTT, of Oneida, in the county of Madison, in the State of New York, have invented new and useful Improvements in Lathe-Chucks, of which the following, taken in connection with the accompanying drawings, is a full, clear, and exact description.

This invention relates to the class of lathe-chucks which are designed to hold drills and analogous tools, and in which the gripping jaws or dogs are arranged to slide toward and from the center of the chuck in a diametric groove in the body of the chuck, and are adjustably sustained in their position to firmly hold the tool in the center of the chuck; and the invention has special reference to the gripping-faces of the jaws or dogs of the chuck.

The object of the invention is to provide the jaws with gripping-faces which shall afford a more secure hold on the tool to be gripped in the chuck without danger of either cutting or bending said tool; and to attain this object I provide the jaws with broad-faced gripping-tongues and corresponding intermediate grooves, all disposed diagonally across the faces of the jaws, and the tongues provided with notches at their centers, the tongues of each jaw being arranged opposite the intermediate grooves of the other jaw, and adapted to enter the said grooves. The notches in the tongues of the jaws afford bearings on four different points of the circumference of the tool gripped by the jaws, and said bearings are broad, and thus obviate the danger of cutting the tool, and by the inclination of the tongues the bearing at one side of the center of each tongue and the bearing of the opposite side of the center of the adjacent tongue of the same jaw are brought within a line drawn across the face of the jaw at right angles to the axes of the chuck, thereby forming on each jaw two series of bearings, which engage the gripped tool at points in lines at right angles to the axes of the chuck, and the engagements extend diagonally across the tool, and thus present a broader engaging face, and at the same time greatly reduce the shearing and torsional strain on the gripped tool, and also obviate the danger of bending the same.

Figure 1:
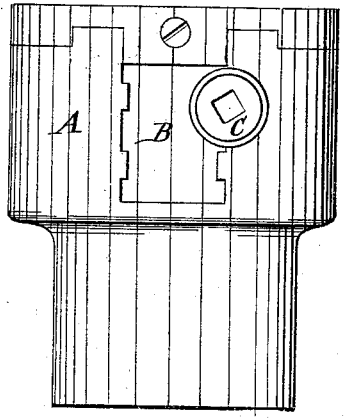
Figure 3:
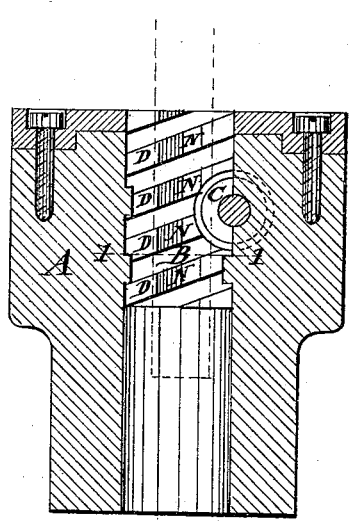
Figure 2:
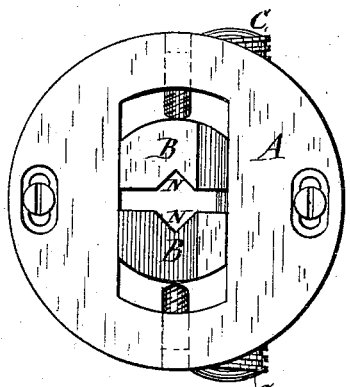
Figure 4:
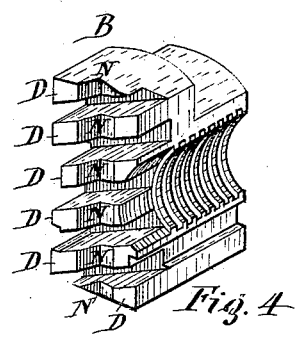

My invention is fully illustrated in the annexed drawings, wherein Figure 1 is a side view of my improved chuck. Fig. 2 is a face view of the same. Fig. 3 is a transverse section of Fig. 2, and Fig. 4 is a detached perspective view of one of the jaws.

Similar letters of reference indicate corresponding parts.

A represents the head or body of the chuck, provided with the usual diametric groove, in which the jaws B B slide toward and from the center of the chuck. A right-and-left screw, C, extending through the body A, and engaging correspondingly-screw-threaded cavities in the sides of the jaws, serves to adjust the jaws in their requisite position to hold the tool or work central in the chuck in the usual and well-known manner.

In a drill-chuck of this class the gripping-faces of the jaws B B are usually provided with teeth or tongues D D, by which to grip the tool or work to be fastened to the chuck, the tongues of one jaw being arranged opposite the interstices between the tongues of the other jaw, so as to allow the two sets of tongues to lap or interlock and embrace a tool of minimum diameter. Heretofore such tongues have been arranged at right angles to the axis of the chuck, and consequently when the jaws were forced against the intervening tool to be gripped the bearings of the tongues on the tool were in lines parallel with the direction of the strain to be resisted by the chuck-jaws, and therefore the jaws were unable to retain the tool from rotating in the chuck without crowding the jaws with great force against the tool. This great pressure of the tongues of the jaws brought to bear diametrically across the sides of the tools at points unsupported at the opposite side subjects the gripped tool to shearing strain, and is liable to either bend or break the tool. This defect I have in a measure overcome in my improved chuck for which I have obtained Letters Patent of the United States, No. 148,788, dated March 17, 1874; but to accomplish this I had to cut the interstices between the tongues too deeply into the sides of the jaw, and thereby not only weakened to some extent the said jaw, but also increased the cost of manufacture. All of the aforesaid defects I now overcome by providing the jaws with broad-faced tongues D D, and with V-shaped notches N N in the centers of said tongues, and disposing the tongues diagonally across the face of the jaw, or obliquely in relation to the axes of the chuck, as illustrated in Fig. 3 of the drawings, the high end of each tongue and the low end of the adjacent tongue of the jaw being in a line drawn across the face of the jaw relatively at right angles to the axes of the chuck, as represented by dotted lines 11 in Fig. 3 of the drawings, thereby causing each jaw to bear on the gripped tool at points at opposite sides of the center of said tool and in diametric lines without subjecting the tool to shearing strain or to liability of being cut. The presentation of the broad diagonal faces of the notches N N of the tongues to the sides of the gripped tool affords to the jaw a firm hold on the tool, and therefore the jaws require less pressure on the tool to be held.

I am aware that prior to my present invention chuck-jaws have been provided with oblique or inclined grooves and ridges on their faces; but in such cases the ridges were sharpened for the express purpose of partially cutting into the work to be held in the chuck, and the ridges were deprived of the central notches, and consequently each jaw bore on the work only at one point in the circumference of the work gripped by the jaws. Furthermore, the tongues or ridges of such jaws were not adapted to enter the grooves of the companion jaws. It is therefore evident that such jaws are incapable of holding a slender tool as securely as my improved chuck-jaws, nor are they without liability of cutting and injuring said tool.

Having described my invention, what I claim as new, and desire to secure by Letters Patent, is—

1. A chuck-jaw having gripping-tongues disposed obliquely in relation to the axes of the chuck and provided with notches N at their centers, as set forth and shown.

2. In a lathe-chuck, the combination of two jaws having gripping-tongues disposed obliquely in relation to the axes of the chuck, and with the tongues of one jaw opposite the interstices between the tongues of the other jaw and adapted to enter the same, substantially as and for the purpose set forth.

3. In a lathe-chuck, the combination of two jaws having broad-faced gripping-tongues disposed obliquely in relation to the axes of the chuck, and each of said tongues provided with a notch at the center, and the tongues of one jaw arranged opposite the interstices between the tongues of the other jaw, substantially as described and shown.

In testimony whereof I have hereunto signed my name and affixed my seal, in the presence of two attesting witnesses, at Oneida, in the county of Madison, in the State of New York, this 5th day of April, 1886.

JOHN H. WESTCOTT. [L. S.]

Witnesses:
H. M. WESTCOTT,
FRANK L. STOCKING.